A. DELKESCAMP.
Improvement in Method of Cutting Thin Material.
No. 124,669. Patented March 19, 1872.
Fig. 1,
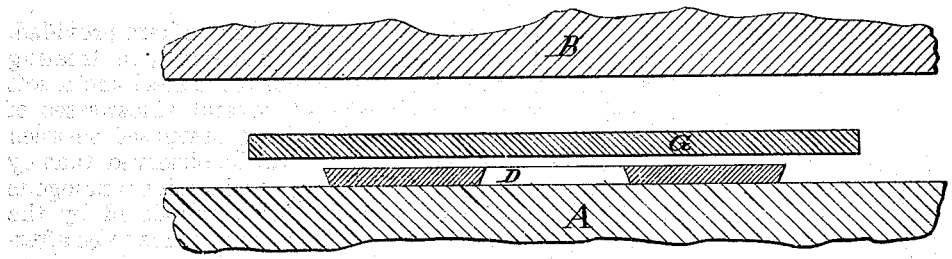
Fig. 2,
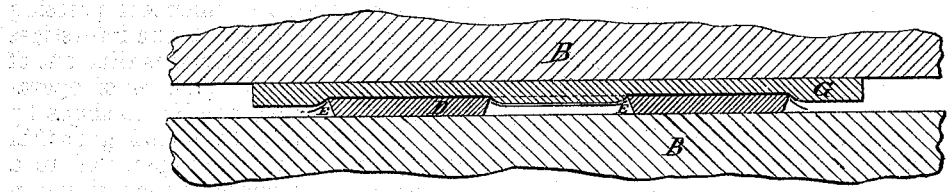
Fig. 3,
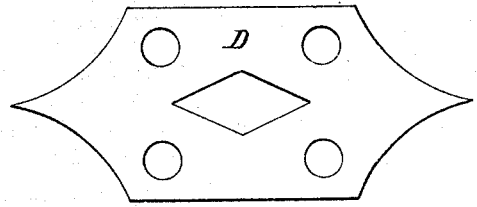
Witnesses, Inventor,

UNITED STATES PATENT OFFICE.

ADOLPH DELKESCAMP, OF BROOKLYN, E. D., NEW YORK, ASSIGNOR TO JACOB J. NICHOLS, OF NEW YORK CITY, AND WM. H. DE GRAW, OF WESTFIELD, NEW JERSEY.

IMPROVEMENT IN METHODS OF CUTTING THIN MATERIAL.

Specification forming part of Letters Patent No. 124,669, dated March 19, 1872.

Specification describing certain Improvements in Means for Cutting Forms in Thin Material, invented by ADOLPH DELKESCAMP, of Brooklyn, E. D., in the county of Kings and State of New York.

The invention relates to the production of forms in thin material, as tin-foil or the like, which may be required for any purposes in the arts. I will describe it as applied to the cutting out of elaborate shapes in tin-foil. Suppose the piece required is to be of a curved and pointed outline with several holes of different shapes distributed over the surface. I prepare a die of hardened steel with a perfectly plain surface both above and below, and a thickness of, say, one-eighth of an inch, and produce the holes therein of exactly the size and contour required. I leave the edges which bound the holes and also the extreme edges of the entire plate as sharp as may be, and, to insure a still better action, bevel under all the edges a little, preferably at an angle of about ten degrees from the perpendicular. Now, laying this die thus prepared on the bed of a suitable press and laying a sheet of tin-foil thereon, I press down powerfully thereon with a sheet of vulcanized rubber. On applying a sufficient pressure and again elevating the platen of the press and removing the rubber, I find the tin-foil cleanly and sharply cut to exactly the pattern required, both around the exterior of the die and also around the several holes. I repeat this operation removing the pieces of tin-foil thus prepared after each operation. The waste material may be blown away or shaken out of the holes in the die at intervals. The rubber may be permanently affixed to the platen of the press. I prefer to do so, as I find that the operation is more successful after the rubber has become printed with the form. I esteem it important in any event that the metal die and the rubber or other soft material be fixed by the aid of a mark or otherwise, so as to be presented to each other in a uniform position at each operation. I believe that gutta-percha, leather, many varieties of gums and compounds, and possibly many varieties of cloth, felt, paper, &c., may be used for the soft surface in lieu of India rubber, as here provided. I have experimented successfully in treating tin-foil with a die of hardened steel and a soft surface composed of several thicknesses of muslin with India rubber interposed between and vulcanized. It will be observed that by this mode of operating, the tin-foil or analogous thin material to be cut is supported by the die over the entire surface which is to be afterward used. Only the portion which is waste is subject to be distorted by the swelling or indenting effect of the rubber. Although, I have here represented the pressure as being vertical, it may, in any particular case be inclined or made to work horizontally; or, if preferred, the die may be placed above the soft material, but there is a superior convenience in pressing the tin-foil down upon and into the interstices in the die. The waste material is thus out of the way for a considerable number of operations. I believe it is practicable to shape by this means not only tin-foil and analogous thin material, but fancy forms in paper, and in a great variety of other material, including perhaps thin leather. I propose, in some instances, to mount the die and also the soft material on rollers or other moving portions of machinery, so that they shall be presented together regularly and rapidly, and act upon each other, as herein specified.

The accompanying drawing forms a part of this specification, and represent one of the simplest forms of applying the idea.

Figure 1 is a vertical section, showing the platen raised; Fig. 2 is a vertical section, showing the platen depressed and the thin tin-foil cut; and Fig. 3 is a face view of the finished article.

Similar letters of reference indicate corresponding parts in all the figures.

A is the plane bed of the press, and B is the platen thereof, the latter being powerfully operated up and down by screws, levers, or other means not represented. The die is represented by D. The tin-foil or other thin material to be treated is indicated by E. G is a sheet, composed of layers of thin muslin and vulcanized rubber. Fig. 1 represents all the parts as open and adapted to allow the introduction and removal of the material E. Fig. 2 represents the parts as powerfully pressed together, so as to effectually divide the thin material along the lines corresponding to the edges of the die D, and of the several holes therein. By reason of the under-cutting or beveling under of the cutting-edges of my die D, I not only insure a sharper angle, and consequently a more efficient cutting-edge around the entire die and around the several holes therein, but also provide a greater space in which the waste material may lie, and consequently make it easier to shake out or otherwise liberate the waste material.

I claim as my invention—

The method of cutting and shaping thin material, as herein set forth.

In testimony whereof I have hereunto set my name in presence of two subscribing witnesses.

ADOLPH DELKESCAMP.

Witnesses:
THOMAS D. STETSON,
CAMPBELL C. LIVINGS.